(12) United States Patent
Sakakida et al.

(10) Patent No.: US 6,378,896 B1
(45) Date of Patent: Apr. 30, 2002

(54) SIDE AIR BAG APPARATUS FOR VEHICLE

(75) Inventors: Masafumi Sakakida; Shouji Nobumoto; Hideaki Tanaka; Sadamu Nishiguchi, all of Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/537,406

(22) Filed: Mar. 29, 2000

(30) Foreign Application Priority Data

Apr. 7, 1999 (JP) .......................................... 11-099652

(51) Int. Cl.$^7$ ........................... B60R 21/20; B60R 21/22
(52) U.S. Cl. ................. 280/730.2; 280/728.2; 280/743.1; 280/743.2; 280/296; 280/146.6
(58) Field of Search ................. 280/730.2, 728.2, 280/743.2, 743.1; 296/146.6, 146.7

(56) References Cited

U.S. PATENT DOCUMENTS

| | | | |
|---|---|---|---|
| 5,231,253 A | | 7/1993 | Breed et al. |
| 5,308,112 A | * | 5/1994 | Hill et al. ................. 280/730.2 |
| 5,447,326 A | * | 9/1995 | Laske et al. ............. 280/730.2 |
| 5,722,685 A | * | 3/1998 | Eyrainer ................. 280/730.2 |
| 5,813,719 A | * | 9/1998 | Kowalski ................. 296/146.6 |
| 5,848,804 A | * | 12/1998 | White, Jr. et al. ....... 280/730.2 |
| 5,865,496 A | * | 2/1999 | Odan et al. ............... 296/146.6 |

FOREIGN PATENT DOCUMENTS

| | | |
|---|---|---|
| EP | 0 686 531 A1 | 12/1995 |
| JP | 04368250 A | 12/1992 |
| JP | 05016757 A | 1/1993 |
| JP | 5-58246 A | 3/1993 |
| JP | 08072658 A | 3/1996 |
| JP | 408072658 A * | 3/1996 |
| JP | 10175495 A * | 12/1996 |
| JP | 10119697 A * | 5/1998 |

* cited by examiner

Primary Examiner—Lanna Mai
Assistant Examiner—Ruth Ilan
(74) Attorney, Agent, or Firm—Nixon Peabody LLP; Donald R. Studebaker

(57) ABSTRACT

The present invention provides a side air bag apparatus including an air bag unit. The air bag unit contains a side air bag and an inflator in its upper and lower portions, respectively. The air bag unit is attached to an inner panel of a side door through upper attaching portions and lower attaching portions. The air bag unit is configured to move in parallel toward a vehicle occupant compartment during a side impact collision by way of a difference in distance between a side impact input position corresponding to a impact bar and each attaching portion. This enables the side air bag unit to avoid damage during the collision. Further, the side air bag can reliably be expanded between an occupant and the side door. A structure for attaching the air bag unit to the side door can also be simplified.

21 Claims, 10 Drawing Sheets

→ CABIN

IN ←——→ OUT

FRONT

SIDE AIR BAG APPARATUS FOR VEHICLE

BACKGROUND OF THE INVENTION

1. Field of the invention

The present invention relates to a side air bag apparatus for a vehicle, in particular, to a side air bag configured to allow an air bag unit equipped in a side door to reliably expand between an occupant and a side door during a side impact collision.

2. Prior Art

Heretofore, a side air bag apparatus for a vehicle has been configured as an air bag unit including a side air bag and an inflator providing a gas for expansion to this side air bag. In this side air bag apparatus, when a side impact (i.e. an collision from lateral direction) is detected by a side impact sensor, the gas for expansion generated from the inflator is provided to the side air bag, and the side air bag is then expanded between an occupant and the side door within an instantaneous term before an occupant secondarily collides against a side door due to the side impact, thereby the occupant is stopped by the expanded side air bag and be protected.

Up to now, a door mounted type side air bag apparatus in which an air bag unit is mounted inside a side door is variously offered for practical use. For example, in Japanese Patent Laid-Open Publication No. 5-58246, a side air bag apparatus is disclosed which has, in internal of a door, an inflator located inside an armrest, and a side air bag located above the inflator and between an door inner panel and a trim. The inflator and the side air bag are airtightly connected to each other through a duct.

A side door of a vehicle has an outer panel and an inner panel. A door trim is located on an inner surface of the side door faced to a vehicle occupant compartment. An opening is also formed on the inner panel for preventing interference between the inner panel and other components and also for attaching components inside the side door. An impact bar, which is excellent in strength and stiffness, is provided near an inner surface of the outer panel. In a recent side air bag, a cushion member made up of foam for shock-absorbing is also provided therein.

In door mounted type side air bag apparatuses, when a side door is deformed by applying an impact load to the side door during a side impact collision, a side air bag may not normally function to expand due to the fact that an inflator can be at fault, or a gas passage portion providing a gas for expansion from the inflator to the side air bag can be broken.

Otherwise, there is the possibility that the side air bag cannot accurately be expanded between an occupant and the side door due to the fact that orientation of the side air bag can be changed by the deformation of the side door.

Thus, in consideration of deformation of the side door during a side impact collision and also a required side door structure, it needs to set up a structure for protecting a portion containing the inflator and a gas passage forming portion, and for attaching the air bag unit to the inner panel with plural attaching portions. Sufficient measures have not been taken to solve the problems described above in the aforementioned side air bag apparatus of Japanese Patent Laid-Open Publication No. 5-58246.

SUMMARY OF THE INVENTION

An object of the present invention is, in a side air bag apparatus for vehicle mounted in a side door, to prevent damage of a side air bag unit during a side impact collision, to reliably expand a side air bag between an occupant and the side door, and to simplify a structure for attaching the air bag unit to the side door.

According to a first aspect of the present invention, a side air bag apparatus for a vehicle comprises:

a single air bag unit mounted in a side door including;

a side air bag expanded between an occupant and the side door when a side impact detector of a vehicle detects a side impact; and an inflator providing a gas for expansion to this side air bag, the side air bag and the inflator being respectively contained in an upper portion and a lower portion of the air bag unit.

An upper attachment and lower attachment secure the air bag unit to an inner panel of the side door, wherein the air bag unit is configured to allow a lower portion of the air bag unit to swingably displace in a larger amount than an upper portion of the air bag unit during a side impact collision by providing at least one of a difference in distance between an input position of a side impact load and each attachment or a difference in the respective attaching strengths of each attachment to the inner panel.

When a side impact is detected by a side impact sensor, the gas for. expansion generated from the inflator is provided to the side air bag, and the side air bag is then expanded from the upper portion of the air bag unit toward a vehicle occupant compartment and is finally expanded between an occupant and the side door within an instantaneous term before an occupant secondarily collides against a side door due to the side impact, thereby the occupant is stopped by the expanded side air bag and is protected.

Since the inflator is contained in the lower portion of air bag unit and the side air bag is contained in the upper portion of air bag unit, and the lower portion of the air bag unit is swingably displaced in a larger amount than the upper portion of the air bag unit during a side impact collision, damage to the inflator and a gas passage portion extending from the inflator to the side air bag during a side impact collision are reliably prevented, thereby the side air bag can reliably be expanded during a side impact collision.

The aforementioned air bag unit is secured to the inner panel of the side door by the upper attachment and the lower attachment. In addition, by providing at least one of a difference in distance between an input position of a side impact load and each attachment or a difference in respective attaching strengths of each attachment to the inner panel, the lower portion of the air bag unit is swingably displaced in a larger amount than the upper portion of the air bag unit during a side impact collision.

On this account, of providing at least one of a difference in distance between an input position of a side impact load and each attachment or a difference in respective attaching strengths of each attachment to the inner panel, the air bag unit is configured to allow a lower portion of the air bag unit to swingably displace in larger amount than an upper portion of the air bag unit during a side impact collision. In typical side impact collisions, since the side impact load is transferred through the outer panel, the impact bar, the inner panel, and so on, the input position of the side impact load to the air bag unit is a position of the air bag unit with respect to the impact bar.

When a side impact load acts on the lower attachment more than to the upper attachment by the difference in distance between an input position of a side impact load and each attachment, the lower attaching means is swingably displaced toward the vehicle occupant compartment in a larger amount than the upper attachment. When the displacement of the lower attachment toward the vehicle occupant compartment becomes lager than the displacement of the upper attachment toward the vehicle occupant compartment by the difference in respective attaching strengths of each attachment, the lower attaching means is swingably displaced toward the vehicle occupant compartment in larger amount than the upper attachment.

According to a second aspect of the present invention, a side air bag apparatus for a vehicle comprises:

a single air bag unit mounted in a side door including;

a side air bag expanded between an occupant and the side door when a side impact detector of a vehicle detects a side impact; and an inflator providing a gas for expansion to this side air bag, the side air bag and the inflator being respectively contained in an upper portion and a lower portion of the air bag unit.

An upper attachment and lower attachment secure the air bag unit to an inner panel of the side door, wherein the air bag unit is configured to move substantially in parallel toward a vehicle occupant compartment during a side impact collision by providing at least one of a difference in distance between an input position of a side impact and the attachment or a difference in respective attaching strengths of each attachment to the inner panel.

During a side impact collision, the side air bag is expanded from the upper portion of the air bag unit toward a vehicle occupant compartment to protect an occupant.

Since the inflator is contained in the lower portion of air bag unit and the side air bag is contained in the upper portion of air bag unit, and the air bag unit is moved substantially in parallel toward a vehicle occupant compartment during a side impact collision, damage to the inflator and a gas passage portion extending from the inflator to the side air bag during a side impact collision are reliably prevented, thereby the side air bag can reliably be expanded during a side impact collision.

The air bag unit is secured to the inner panel of the side door by the upper attachment and the lower attachment. In addition, by providing at least one of a difference in distance between an input position of a side impact load and each attachment or a difference in respective attaching strengths of each attachment to the inner panel, the air bag unit is moved substantially in parallel toward a vehicle occupant compartment during a side impact collision. On this account, the air bag unit is configured to move substantially in parallel toward a vehicle occupant compartment during a side impact collision by providing at least one of a difference in distance between an input position of a side impact load and each attachment or a difference in respective attaching strengths of each attachment to the inner panel. In typical side impact collision, since the side impact load is transfer through the outer panel, the impact bar, the inner panel, and so on, the input position of the side impact load to the air bag unit is a position of the air bag unit corresponding to the impact bar.

When substantially the same load is respectively acted to the lower attachment and the attachment means by a difference in distance to each attachment, the lower attachment and the upper attachment are moved substantially in parallel toward a vehicle occupant compartment. Due to the synergistic action caused from a difference in distance between an input position of a side impact load and each attachment and a difference in respective attaching strengths of each attachment to the inner panel, it may be caused the lower attaching means and the upper attachment to move substantially in parallel toward a vehicle occupant compartment.

According to a third aspect of the present invention, a side air bag apparatus for a vehicle comprises:

a single air bag unit mounted in a side door including;

a side air bag expanded between an occupant and the side door when a side impact detector of a vehicle detects a side impact; and an inflator for providing a gas for expansion to this side air bag, the side air bag and the inflator being respectively contained in an upper portion and a lower portion of the air bag unit.

An upper attachment and a lower attachment secure the air bag unit to an inner panel of the side door, wherein the air bag unit is configured to allow a lower portion of the air bag unit to swingably displace in larger amount than an upper portion of the air bag unit during a side impact collision by locating the side air bag unit inside an impact bar in width direction of a vehicle and setting up a distance between the impact bar and the lower attachment in a vertical direction smaller than a distance between the impact bar and the upper attachment in the vertical direction.

The aforementioned apparatus basically takes the same effect as the apparatus of the first aspect. That is, when a distance between the impact bar and the lower attachment in the vertical direction is smaller than the distance between the impact bar and the upper attachment in the vertical direction, a side impact load acting to the lower attachment becomes larger than a side impact load acting to the upper attachment, thereby a lower portion of the air bag unit is swingably displaced in a larger amount than an upper portion of the air bag unit during a side impact collision. As a result, damage to the inflator and a gas passage portion extending from the inflator to the side air bag during a side impact collision are reliably prevented, thereby the side air bag can reliably expand during a side impact collision as does the apparatus of the first aspect.

As a first preferable configuration in the apparatuses of the first, second and third aspects, each apparatus may further include a reinforcing member provided between the air bag unit and the inner panel covering an upper attaching portion to which the air bag unit is attached by the upper attachment and a lower attaching portion to which the air bag unit is attached by the lower attachment. Thus, stiffness around from the lower attaching portion to the upper attaching portion is increased so that it can certainly prevent the air bag unit from being deformed in a folded shape between the lower attaching portion and the upper attaching portion.

As a second preferable configuration in the apparatus of the third aspect, the apparatus may further include a shock-absorbing member provided between the air bag unit and the impact bar. Thus a side impact load can be absorbed through the shock-absorbing member and this reduced load acts on the air bag unit through the shock-absorbing member so that damage, such as local deformation of the air bag unit, can certainty be prevented.

As a third preferable configuration in the apparatuses of the first, second and third aspects, the air bag unit may be located between the inner panel and a door trim, and a containing portion of the inflator may be formed to protrude toward a vehicle occupant compartment more than a containing portion of the air bag. Further at least part of the inflator-containing portion may be located in an internal space of an armrest. In addition the air bag unit may be secured to the inner panel through the lower attachment at a position corresponding to a gas passage forming portion in which a gas passage portion is formed for providing a gas from the inflator to the side air bag.

Therefore, by way of making the inflator-containing portion protrude toward a vehicle occupant compartment more than the air bag containing portion and also locating at least part of the inflator-containing portion in an internal space of an armrest, a side impact load acts on the inflator-containing potion as little as possible during a side impact collision so that damage in the inflator-containing portion can be prevented and the internal space of the armrest can be effectively utilized for locating part of the inflator-containing portion.

Further since this air bag unit is secured to the inner panel through the lower attachment at a position corresponding to a gas passage forming portion in which a gas passage portion is formed for providing a gas from the inflator to the side air bag, it can prevent a side impact precedently acting on the inflator. In addition, though the gas passage forming portion lacks stiffness due to less thickness a in width direction of a vehicle compared with that of the inflator, braking down by bending due to a side impact load can be prevented.

In the first preferable configuration, the air bag containing portion of the 20 air bag unit may be formed to protrude toward the inner panel more than the inflator-containing portion. In addition, the apparatus may further include a first opening portion formed in the inner panel and opposed to a resultant protruding portion, wherein the reinforcing member may be formed in frame shape surrounding the first opening portion. Thus, since the air bag containing portion is protruded toward the inner panel more than the inflator-containing portion and the first opening portion opposed to the protruding portion is formed in the inner panel, it can make a side impact load difficult to act from the inner panel to the air bag containing portion.

Further, by means of providing the reinforcing member surrounding the first opening portion, strength and stiffness of an attaching structure for attaching the air bag unit to the inner panel can be increased and strength and stiffness of the inner panel in surrounding area of the first opening portion can be also increased.

In the third preferable configuration, the apparatus may further include a first displacement allowable portion located between the gas passage forming portion and the armrest to allow the gas passage forming portion to displace toward a vehicle occupant compartment during a side impact collision. Thus since displacement of the gas passage forming portion to a vehicle occupant compartment when the air bag unit is deformed to the vehicle occupant compartment by applying a side impact load, it can prevent that the gas passage forming portion is compressed or deformed in bended shape.

In the third preferable configuration, the apparatus may further include a second displacement allowable portion provided between the inflator-containing portion and the armrest to allow the inflator-containing portion too displace toward a vehicle occupant compartment during a side impact collision. Thus, since displacement of the inflator-containing portion toward a vehicle occupant compartment is allowed through the second displacement allowable portion when the air bag unit is displaced toward the vehicle occupant compartment by applying a side impact load, it can make it difficult to apply a compression load to the inflator-containing portion, thereby it can also prevent the inflator-containing portion from being damaged.

In the second preferable configuration, the apparatus may further include a second opening portion formed in the inner panel with being opposed to a lower portion of the inflator-containing portion, wherein at least part of the shock-absorbing member may be located between the impact bar and the lower attaching portion to which the air bag unit is attached by the lower attachment. Thus, since the second opening portion opposed to the lower portion of the inflator-containing portion is formed in the inner panel, it can make a side impact load difficult to be applied from the inner panel to the inflator-containing portion, thereby it can also prevent the inflator from being damaged. In addition, since at least part of the shock-absorbing member is located between the impact bar and the lower attaching portion to which the air bag unit is attached by the lower attachment, the load input to the lower attaching portion from the impact bar can be absorbed.

In the aforementioned preferable configurations, the apparatus may further include a second shock-absorbing member provided at a position corresponding to the air bag containing portion of the air bag unit with being separated from or integrated with the shock-absorbing member and the position is located outside the air bag containing portion in width direction of a vehicle. Thus the second shock-absorbing member is provided at the outside position corresponding to the air bag containing portion so that a side impact load acted to the air bag containing portion can be absorbed, thereby its damage can be prevented.

DETAILED DESCRIPTION OF THE PREFERRED EMBODIMENTS

Figure 1:
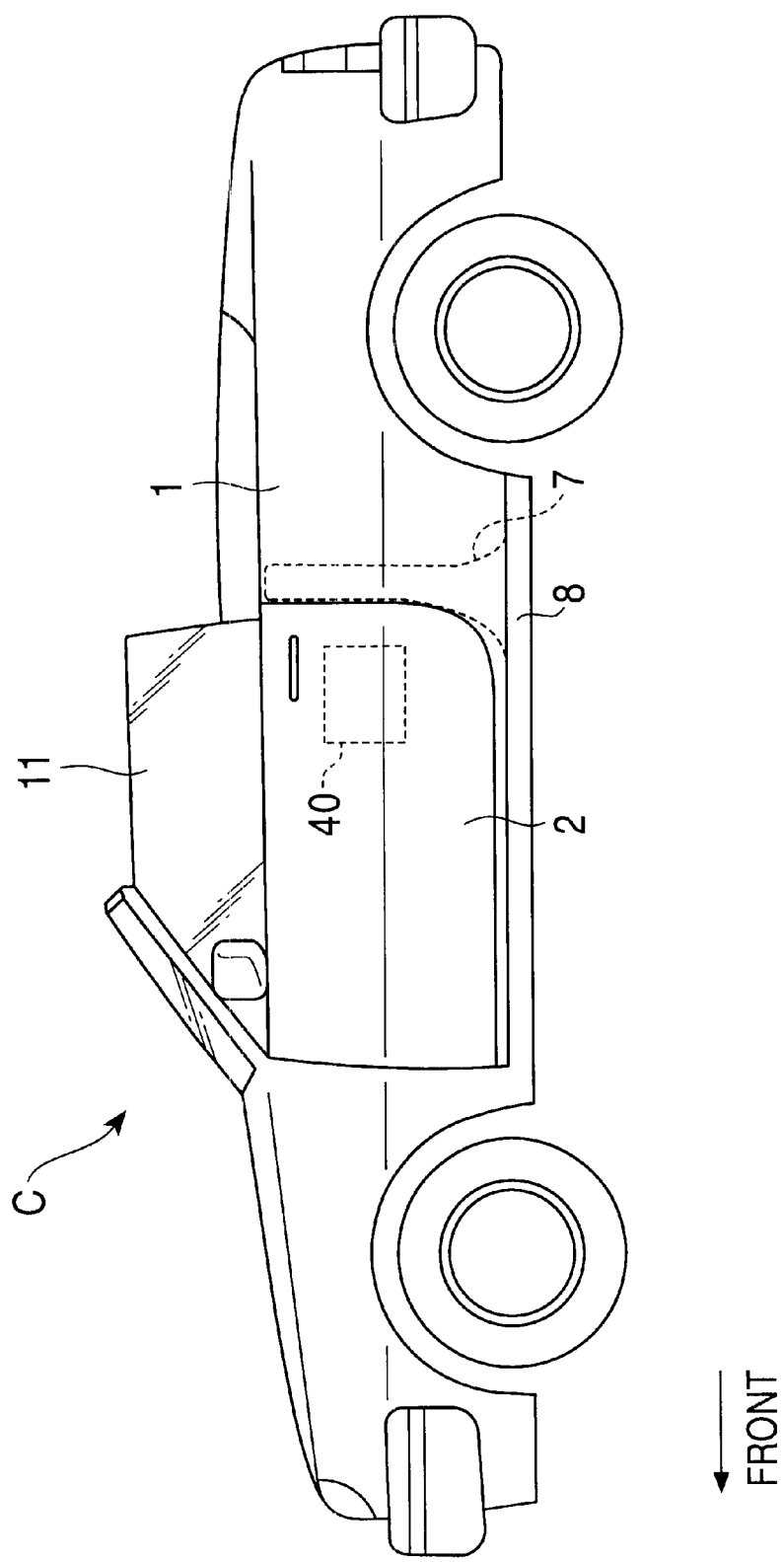
FIG. 1 is a side view showing an automobile according to one embodiment of the present invention.

Hereinafter, an embodiment of the present invention will be described 20 with reference to the drawings.

This embodiment is one example in which the present invention is applied to a side air bag apparatus equipped in a side door of a pillar-less type (open roof type) automobile.

As shown in FIGS. 1 to 4, a pillar-less type automobile C has a vehicle body 1, a pair of right and left doors 2, and a pair of right and left seats 3, which are slidable in frontward and rearward directions by sliding an upper rail 3b secured at a bottom of the seat to a lower rail 3a secured on a vehicle floor equipped in an internal of the vehicle body 1. An air bag unit 40 of a side air bag apparatus 5 is equipped in each side door 2.

Figure 2:
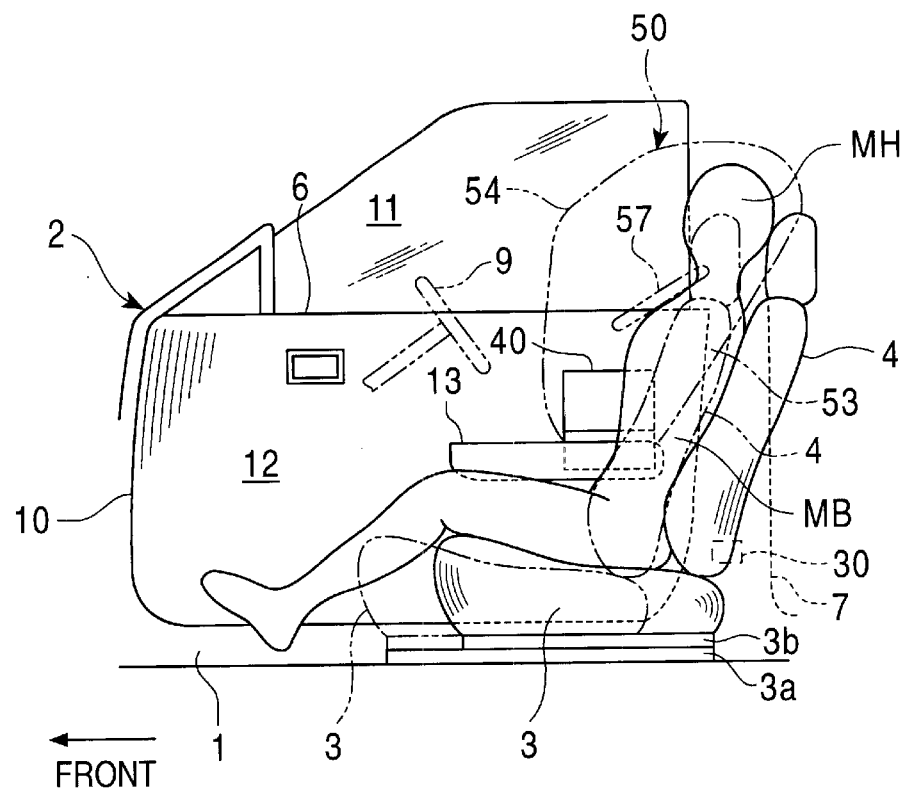
FIG. 2 is a side view from inside showing a side door and a seat of an automobile.
Figure 3:
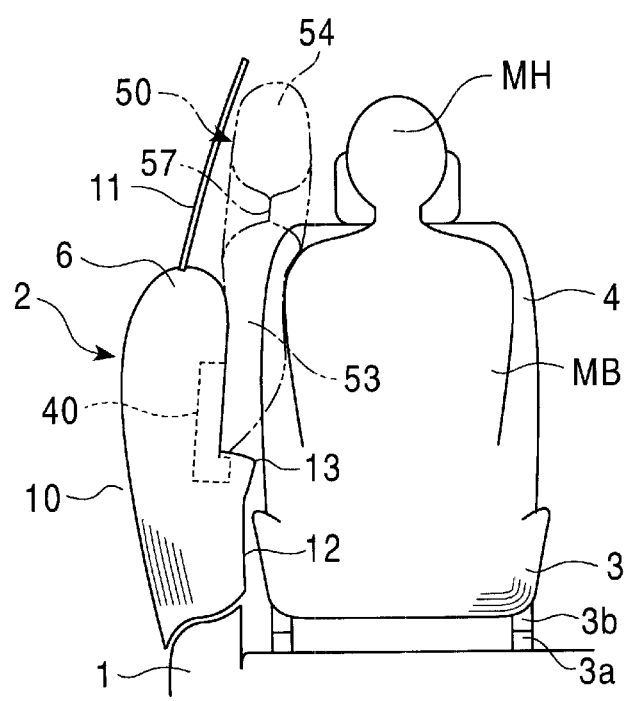
FIG. 3 is a partial view showing a substantial part of a side door and a seat of an automobile.

The side door 2 includes a door body 10, an electric motor-drive type wind sealed glass 11 and a door lock mechanism. The air bag unit 40 is mounted in a rear portion on the door body 10. A door trim 12 is attached to an interior surface of the door body. An armrest 13 is provided on a rear portion of the door trim an at approximately middle portion in vertical direction. FIG. 2 and FIG. 3 show a view in a driver seat and the reference number 9 shown in FIG. 2 indicates a steering wheel.

Figure 4:
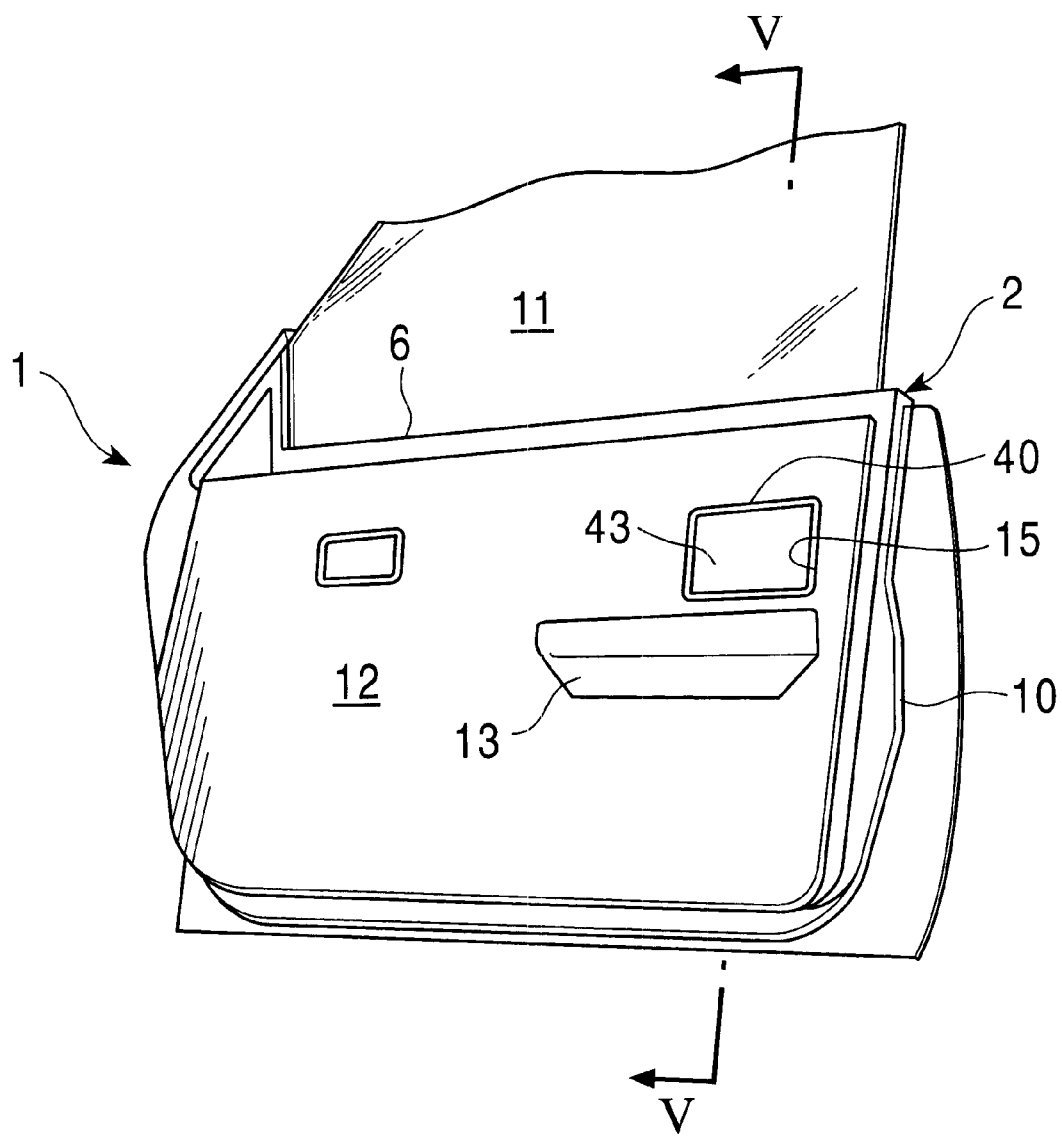
FIG. 4 is a perspective view showing a side door.
Figure 5:
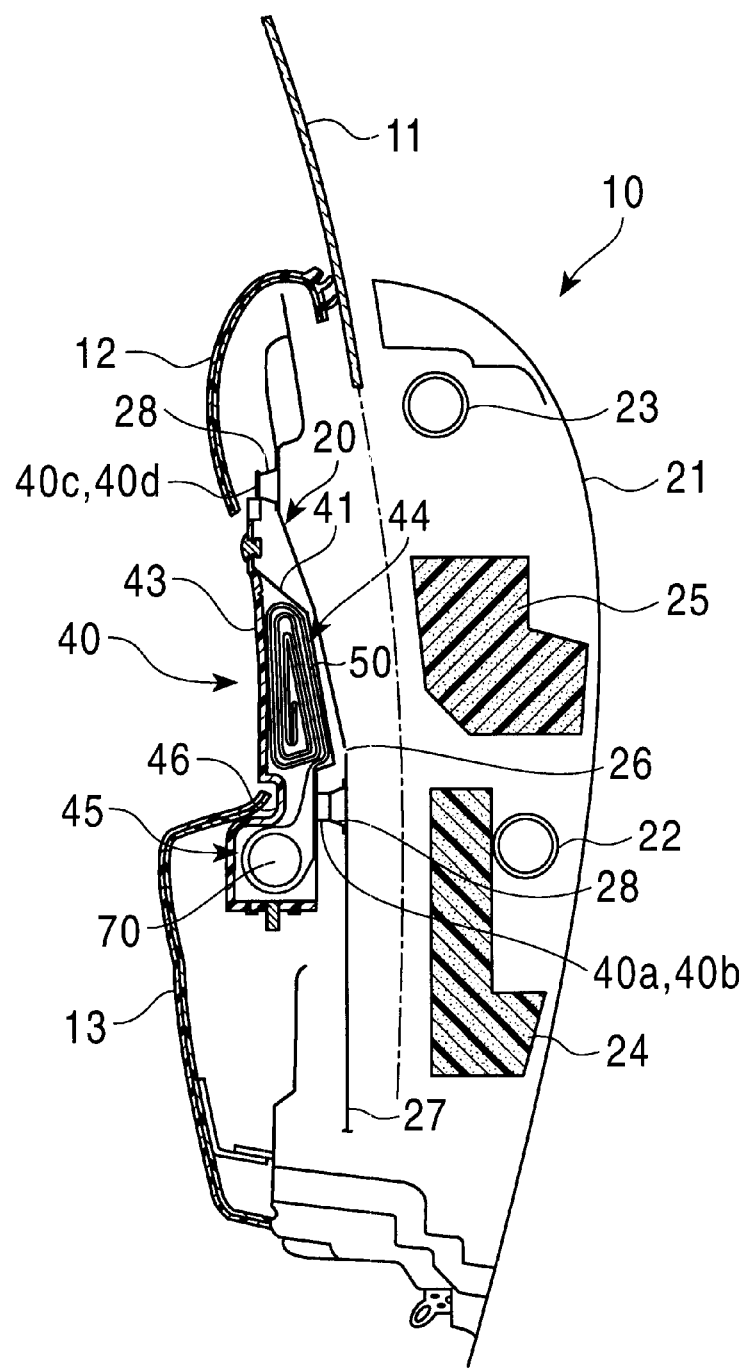
FIG. 5 is a sectional view taken along line V—V of FIG. 4.

As shown in FIG. 4 and FIG. 5, a rectangular opening 15 is formed in the door trim 12 above the armrest 13. A casing 41 of the air bag 40 is inserted from internal of the door body into the opening 15. A cover member 43 of the casing 41 is faced to a vehicle occupant compartment to make a substantially continuous surface with the door trim 12, that is, to make up part of the door trim 12. Thus the side air bag 50 will be expanded toward the vehicle occupant compartment after the side air bag brakes up the cover member 43.

Figure 6:
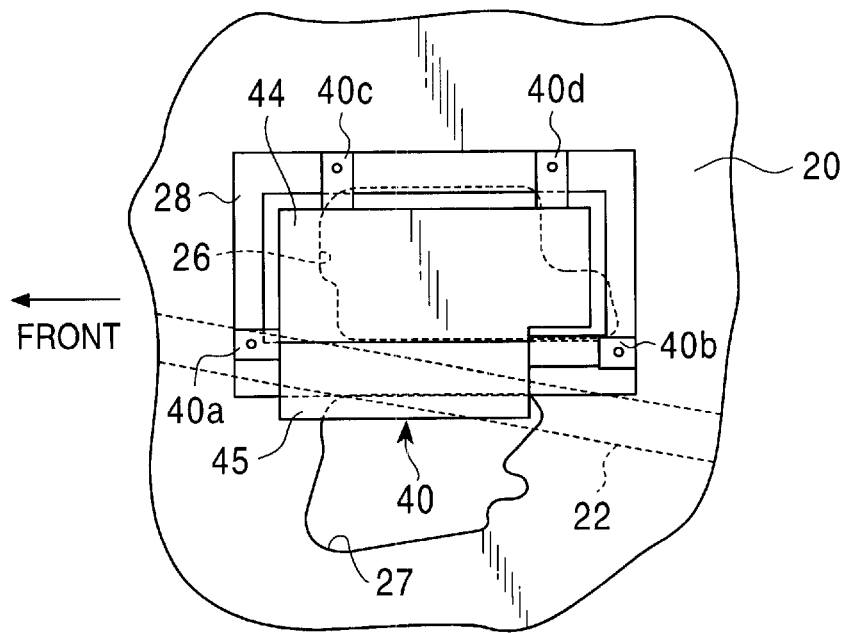
FIG. 6 is a partial side view showing a lumber part of an inner panel.

As shown in FIG. 5 and FIG. 6, the door body 10 comprises an inner panel 20, an outer panel 21 and various reinforcing members reinforcing these panels 20, 21. Metal pipe-like impact bars 22, 23 directed to longitudinal direction as one of the aforementioned reinforcing members and a shock-absorbing member 24, 25 made of such material such as foamed plastics material are provided Inside the door body 10.

The side air bag apparatus will be described hereinafter. As shown in 25 FIG. 7 to FIG. 9, the side air bag apparatus 5 includes a side impact-detecting sensor 30 as a side impact detecting means for detecting a side impact, a single side air bag 50, which is expanded between an occupant and the side door 2 when the side impact detecting sensor 30 detects a side impact, and an inflator 70 providing a gas for expansion to the side air bag. The single air bag unit 40 containing the side air bag 50 and the inflator 70 is equipped in rear region within the side door.

Figure 7:
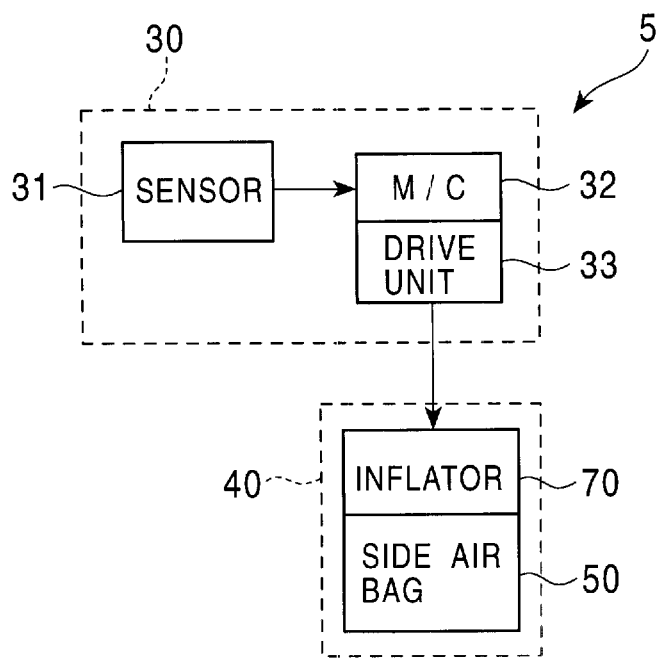
FIG. 7 is a block diagram showing an electric drive system of a side air bag apparatus.

As shown in FIG. 7, the side impact detecting sensor 30 is configured as a integrated side impact sensor comprising a sensor unit 31, microcomputer (MIC) 32 connected to the sensor unit 31, and a drive unit 33 connected. to this microcomputer 32 for outputting a driving current to activate the inflator 70 during a side impact collision. The sensor 30 is incorporated in lower portion of a center pillar. As shown in FIG. 1 and FIG. 2, a shape of lower portion of this center pillar 7 is formed in getting wider in longitudinal direction as closing with a side sill 8 and is secured to the side sill 8.

As shown in FIG. 5, FIG. 6, FIG. 8 and FIG. 9, the air bag unit 40 is disposed between the inner panel 20 and the door trim 12, and includes a casing 41 having rectangular shape in side view and a relatively narrow width in a width direction of the vehicle. The casing 41 comprises a casing member 42 made of metal and having an opening faced to the vehicle occupant compartment, and a cover member 43 made of synthetic resin and covering this casing member 42 from the vehicle occupant compartment. An air bag containing portion 44 is formed within a substantially upper half of the casing 41, i.e. an upper portion of the air bag unit 40, and an inflator-containing portion 45 is formed within a vicinity of lower end of the casing 41, i.e. a lower portion of the air bag unit 40, in the manner that the inflator-containing portion 45 is protruded toward the vehicle occupant compartment more than the air bag containing portion 44 to be formed as a protruded portion.

In other word, the air bag containing portion 44 is formed to protrude toward the inner panel 20 more than the inflator-containing portion 45. In the air bag containing portion 44, the side air bag 50 is contained with being folded in roll-like. In the inflator-containing portion 45 located under the air bag containing portion 44, the inflator 70 directed to longitudinal direction is contained. In addition, a gas passage forming portion 46 in which a gas passage portion 59 is formed from a part of the casing 41 and cover member 43, such as a recess portion 47 which is made by inwardly deforming a part of the cover member 43, is located between these containing portions 44, 45.

With respect to a structure for attaching the air bag unit 40 to the side door 2, the air bag unit 40 is attached to the inner panel 20 to make the upper potion and lower portion of the air bag unit 40 displace approximately in parallel during a side impact collision.

Figure 8:
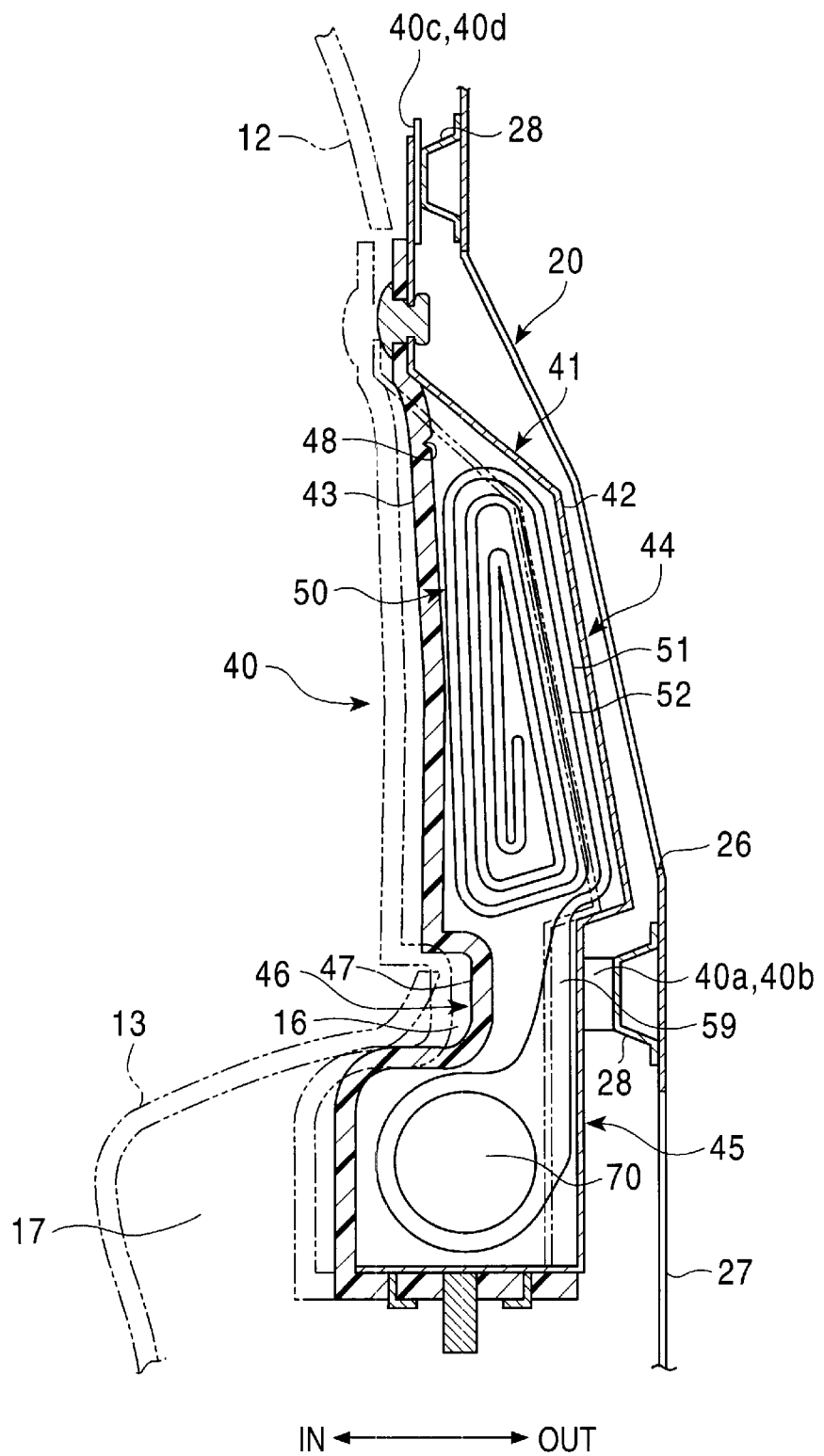
FIG. 8 is a longitudinal sectional view showing an air bag unit.

That is, as shown in FIG. 5, Fig, 6 and FIG. 8, in rear portion of the inner panel, a first opening portion 26 is formed in an area corresponding to the aforementioned protruded portion in the air bag containing portion 44 of the air bag unit 40, and a second opening portion 27 is formed in an area corresponding to a lower portion of the inflator-containing portion 26, which is located just under the first opening portion. A reinforcing member 28 in rectangular shaped frame is attached from an inner side in width direction of the vehicle to surround the first opening portion 26.

The air bag unit 40 described above is located inside in width direction of the vehicle more than the impact bar 22. The air bag unit is attached to the reinforcing member 28 from inner side in width direction of the vehicle through a pair of right and left lower attaching portions 40a, 40b as a lower attachment, which are disposed at approximately the same height as the impact bar 22 and the gas passage forming portion 46 (gas passage portion 59), and also a pair of right and left upper attaching portions 40a, 40b as upper attachments, which are disposed above the lower attaching portions 40a, 40b, where the air bag containing portion 44 can be seen from the inner side in width direction of the vehicle through the first opening portion 26. As described above, all of the attaching portions 40a to 40d are connected and secured to the reinforcing member 28.

An breakable portion 48 is formed at an upper end portion of the cover member 43 making up the air bag containing portion 44 by making a longitudinally extending V-shaped groove from internal of the air bag containing portion 44. Thus, the side air bag 50 will be expanded toward the vehicle occupant compartment after braking down this breakable portion 48. The seat 3 is configured to enable a seat back of the seat to slide for moving from a forwardly moved position as shown by two-dots chain line to a rearward position crossed over the airbag unit 40 as shown by solid line in FIG. 2.

As shown in FIG. 5 and FIG. 8, with attaching the air bag unit 40 to the 15 side door 2, at least part of the inflator-containing portion 45 is located in an internal space of an upper end portion of the armrest. The shock-absorbing member 24 described above is located to allow its upper end portion to face between the lower attaching portions 40a, 40b and the impact bar 22. The shock-absorbing member 25 described above is located at an outward position in width direction of the vehicle corresponding to the air bag containing portion 44.

As shown in FIG. 8, the upper end portion of the armrest 13 is pinched by the recess portion 47 of the air bag unit 40. Thus, a first displacement allowable portion 16 is formed between the gas passage forming portion 46 and the armrest 13 to allow the gas passage forming portion 46 to be displaced toward a vehicle occupant compartment during a side impact collision. A second displacement allowable portion 17 is provided between the inflator-containing portion 45 and the armrest, which is part of the door trim 12 of the side door 2 to allow the inflator-containing portion 45 to be displaced toward a vehicle occupant compartment during a side impact collision.

In a typical side impact collision, since a side impact load is transferred through the outer panel 21, the impact bar 22, the inner panel 20, and so on to the internal of the door body 10, the input position of the side impact load to the air bag unit 40 is a position of the air bag unit corresponding to the impact bar 22.

At the same moment, the side impact load is also acts on an upper portion of 10 the impact bar 22. As described above, the upper end portion of the shock-absorbing member 24 is located between the lower attaching portions 40a, 40b and the impact bar 22. The shock-absorbing member 25 is located corresponding to the air bag containing portion 44.

Thus, during a collision, by way of the difference in a distance 15 between the impact bar 22, which is a side impact input position, and each attaching portion 40a (40b), 40c (40d), when the lower portion of the air bag unit 40 is moved toward the vehicle occupant compartment through the shock-absorbing member 24, the upper attaching portion 40c, 40d is also moved toward the vehicle occupant compartment through the reinforcing member 28 by the shock-absorbing member 25 so that the air bag unit 40 would be moved in parallel toward the vehicle occupant compartment as shown by two-dot chain line in FIG. 8.

As shown in FIG. 8 to FIG. 11, the side air bag 50 is formed into a bursiform product, which can be maintained air tight, by joining both peripheral end portions of a door side film member 51 for a door side bag portion and an occupant side film member 52 for an occupant side bag portion. Further, the side air bag 50 includes a middle body bag portion 53 as a lower bag portion, which is expanded to a position corresponding to a middle body MB of an occupant, a head bag portion 54 as an upper bag portion, which is expanded to a position corresponding to a head MH of an occupant, a partition line 57, which makes each bag portions 53, 54 portions separate above and below respectively excepting front and rear end portions in which two vent passages are respectively located, and a tether 58 (control portion) located more forward than a gas nozzle 71 of the inflator in the lower end area of the side air bag 50. The middle body bag portion 53 and the head bag portion 54 are formed by integrating both bag films 51, 52.

The inflator 70, for example, has a structure in which a gas generating material is contained in a longitudinally positioned elongated cylindrical case and the gas generating material causes a reaction by driving current output from the drive unit 33 of the side impact detecting sensor 30 to instantaneously generate a gas for expansion during a side impact collision. A number of gas nozzles 71 for blowing out a gas for expansion into the side air bag 50 are provided at an rear portion of this inflator 70. The lower end of the side air bag is secured within the inflator-containing portion 45 to airtightly cover the inflator. The gas passage portion 59 is formed at a position corresponding toe, the gas passage forming portion 46 for providing a gas from the inflator 70 to the side air bag 50.

Figure 9:
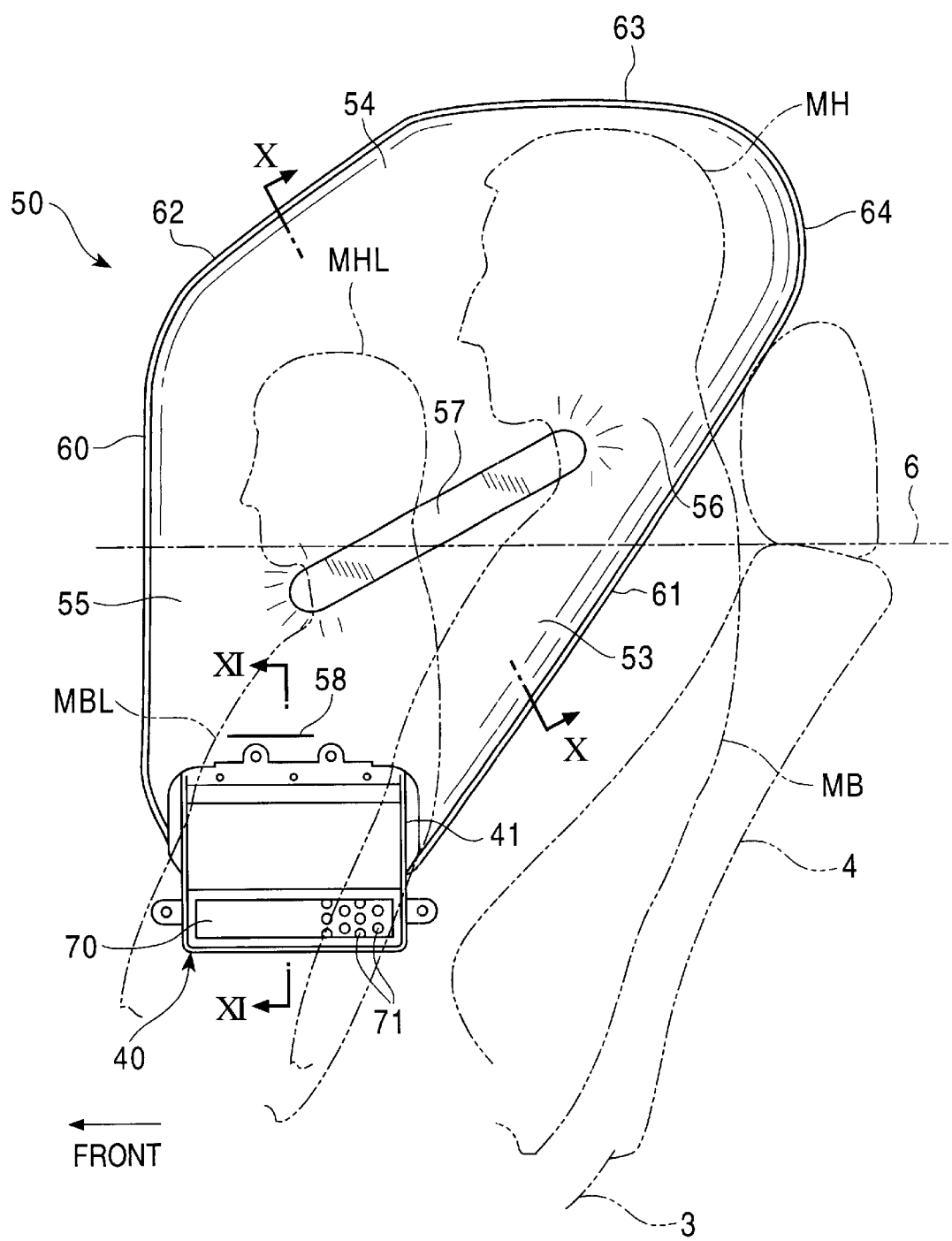
FIG. 9 is a side view showing an expanded side air bag.
Figure 10:
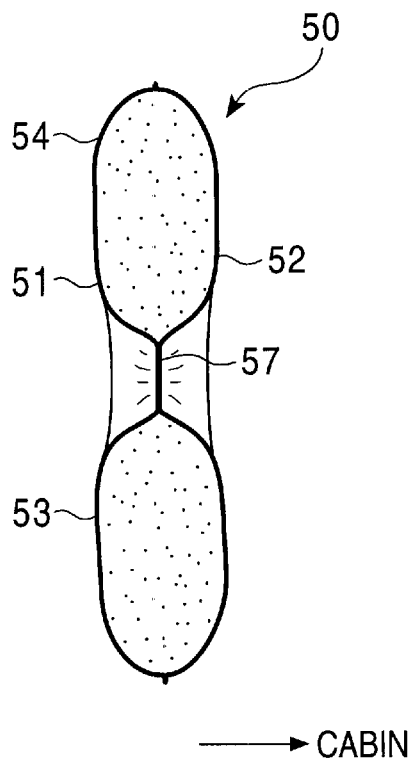
FIG. 10 is a sectional view taken along line X—X of FIG. 9.
Figure 11:
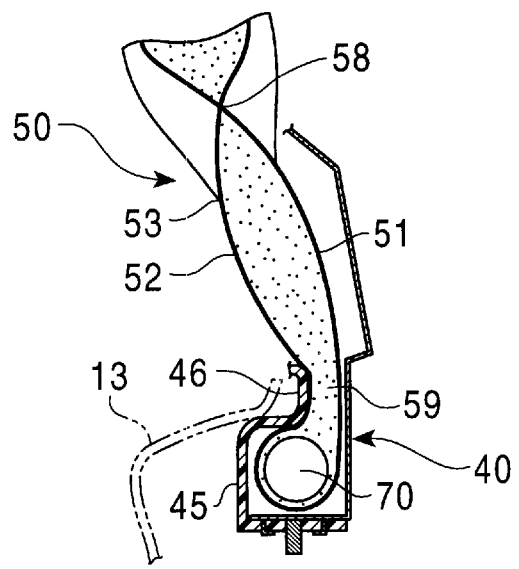
FIG. 11 is a sectional view taken along line XI—XI of FIG. 9.

As shown in FIG. 9, the side air bag is configured to be upward and agley rearward expanded from the air bag unit 40. In an expanded condition of the side air bag, its front end is shaped into a front vertical portion 60, which rises up approximately vertically upward from a front end of the air bag unit 40, and its rear end is shaped into a rear slanted portion 61, which linearly extends upward agley rearward from a rear end of the air bag unit 40. Further, an upper front end portion of the expanded side air bag is shaped into a slanted portion 62, which linearly slants approximately in parallel with the partition line 57 angling downward going forward, In its upper end portion, it is shaped into a horizontally linear horizontal portion 63, which is continuously connected to the slanted portion 62, and a rear end potion of the upper end portion is shaped into curved portion 64, which connects to the rear slanted portion 61 and the horizontal portion 63.

This side air bag 50 is configured to enable it to be expanded between an occupant sitting on the seat 3 and the side door 2 even if a longitudinal position of the seat 3 is adjusted to change a longitudinal position of the occupant. That is, the seat 3 equipped in the vehicle body 1 of this embodiment is configured to enable to longitudinally slide between two-dots chain line and solid line shown in FIG. 2, and the side air bag has a longitudinal length to enable to be expanded between an occupant sitting on the seat 3 and the side door 2 even if the seat is adjusted in any longitudinal sliding position.

The partition line 57 is longitudinally formed by linearly sewing up (or bonding) over a predetermined distance to couple the door side bag film 51 and the occupant side bag film 52. Therefore, in the side air bag 50, a thickness of a portion around the partition line 57 in width direction of the vehicle would be smaller than that of other portion of the side air bag. Further, in the expanded condition, the side air bag 50 is configured to allow a front portion of the side air bag to be lower in a horizontal direction going forward, i.e. to allow a rear portion of the side air bag to be higher going rearwardly substantially along a slanting straight line. In addition, the side air bag is configured to make it expand in the direction around a lower end of the curved portion 64 located around the upper end of the side air bag rear end during its expansion.

A distance between the partition line 57 and the rear slanted portion 61 is also configured to get narrower going upward. The slanted potion 62 described above is also shaped into a slanting line approximately in parallel with the partition line 57.

A position and an inclination of the partition line 57 in the expanded condition will be described. A front portion of the partition line 57 is positioned under a belt line 6, while a rear portion of the partition line 57 is positioned above the belt line 6. That is, the partition line 57 is set up to position corresponding to the side of a neck portion of an occupant all the time.

The seat position is generally adjusted depending on body height of an occupant or the like. In this case, assuming that the seat 3 is adjusted to slide frontward more for a shorter body height, a locus of a neck position of an occupant is slanted more going forward. The position and inclination of the partition line 57 is set up to be along the locus.

In the expanded condition, the tether 58 described above is formed by horizontally sewing up over a predetermined length to couple the door side bag film 51 and the occupant side bag film 52 at a position corresponding to a line between the gas nozzle 71 of the inflator 70 and a front vent passage 55 in order to control a gas flow to the front portion of the side air bag 50 so that the gas would be flown into the rear portion of the side air bag 50 by priority.

As apparent from FIG. 9, the side air bag 50 has a longitudinal length to enable it to be expanded between an occupant on the seat 3 and the side door 2 even if the seat 3 is adjusted in any longitudinal sliding position. That is, the side air bag 50 is configured to allow a longitudinal distance between the inflator 70 and its rear end to be larger than a longitudinal distance between the inflator 70 and its front end in the expanding condition. However, since the gas nozzle 71 is located at the rear portion of the inflator 70, the tether 58 is formed at a front side of the gas nozzle 71, and the partition line 57 is formed in a straight line slanted to be higher going rearward, a gas from the inflator 70 is flown into the rear potion of the side air bag 50 by priority so that an expansion of the rear portion of the side air bag is facilitated during its expansion.

A function and an effect of the side air bag apparatus 5 configured as such. In the case that other automobile collides against this automobile C in lateral direction, in the side air bag apparatus 5, when a side impact sensor 30 detects a side impact, the gas for expansion generated from the inflator 70 is provided to the side air bag 50. The side air bag 50 is then expanded from the upper portion of the air bag unit 40 toward the vehicle occupant compartment, and the side air bag 50 is then upward and agley rearward expanded between an occupant and the side door 2 within an instantaneous term before an occupant secondarily collides against a side door due to the side impact, thereby the occupant is stopped by the expanded side air bag protected.

Initially, during a side impact collision of this automobile C, as 20 described above, since the side impact load is transferred through the outer panel 21, the impact bar 22, the inner panel 20, and so on, the input position of the side impact load to the air bag unit 40 is mainly a position of the air bag unit corresponding to the impact bar 22. At the same moment, some side impact load also acts on an upper portion of the impact bar 22. That is, after the side impact load of the impact bar 22 is absorbed by the shock-absorbing member 24, the load is transferred to the lower attaching portions 40*a*, 40*b* through the reinforcing member 28. The side impact load acting on the shock-absorbing member 24 is also absorbed and is then transferred to the upper attaching portion 40*c*, 40*d* through the reinforcing member 28.

At this moment, by providing the reinforcing member 28 surrounding the first opening portion 26, stiffness in a structure for attaching the air bag unit 40 to the inner panel 20 and strength and stiffness of the inner panel 20 in the vicinity of the first opening portion 26 are strengthened, thereby damage to the air bag unit 40, such as local deformation, can reliably be prevented. Now, since the air bag containing portion 44 is protruded toward the inner panel 20 more than the inflator-containing portion 45, and the first opening portion 26 opposed to its protruded portion is formed in the inner panel 20, damage of the side air bag can be prevented by absorbing a side impact load acting on the air bag containing portion 44 from the inner panel 20.

Further, since the air bag unit 40 is secured to the inner panel 20 through 15 the lower attaching portions 40*a*, 40*b* at the position corresponding to the gas passage forming portion 46 in which the gas passage portion 59 is formed for providing a gas to the side air bag 50, it can prevent that a side impact load acts to the inflator and the gas passage forming portion 46 is broken by bending. Since the first displacement allowable portion 16 is provided between this gas passage forming portion 46 and the armrest 13, when the air bag unit 40 is displaced toward the vehicle occupant compartment due to an action of a side impact load, a displacement of the gas passage forming portion 46 is allowed through the first displacement allowable portion 16 50 that it can prevent the gas passage forming portion 46 is compressed or deformed by bending.

In addition, since the inflator-containing portion 45 is protruded toward the vehicle occupant compartment more than the air bag containing portion 44 and the upper end of the inflator-containing portion 45 is located in the internal space of the armrest 13, a side impact load does not allow to act to the inflator-containing portion 45 during a side impact collision so that damage of the inflator-containing portion 45 can be prevented. Since the second displacement allowable portion 17 is also provided between the inflator-containing portion 45 and the armrest 13, when the air bag unit 40 is displaced toward the vehicle occupant compartment due to an action of a side impact load, a displacement of inflator-containing portion 45 is allowed through the second displacement allowable portion 17 so that a compression load is hardly acted to the inflator-containing portion 45, thereby the inflator-containing portion is hardly damaged.

Further, since the second opening portion 27 opposed to the lower portion of the inflator-containing portion 45 is formed in the inner panel 20, the side impact load, which acts from an inner panel 20 to the inflator 15 containing portion 45, is absorbed so that damage of the inflator 70 can be prevented. Thus, during a collision, no damage or bending of the air bag unit 40 is caused and the shape of the air bag unit is maintained, by means of the difference in a distance between the impact bar 22 and each upper/lower attaching portions 40*a* (40*b*), 40*c* (40*d*), when the lower portion of the air bag unit 40 is moved toward the vehicle occupant compartment through the shock-absorbing member 24, the upper attaching portion 40*c*, 40*d* is also move toward the vehicle occupant compartment through the reinforcing member 28 by the shock-absorbing member 25 so that the air bag unit 40 would be moved in parallel toward the vehicle occupant compartment as shown by two-dot chain line in FIG. 8.

As a result, damage to the inflator 70 and the gas passage 59 extending from the inflator 70 to the side air bag 50 during a side impact collision can reliably be prevented so that the side air bag 50 can reliably be expanded.

During expanding the side air bag 50, the tether 58 controls (restricts) the expansion in width direction of a portion of the side air bag 50 where the tether 58 and its vicinity is located and also a gas flow from the gas nozzle 71 of the inflator 70 to the front vent passage 55 SO that the gas blown out from the gas nozzle 71 would be flown into the rear portion of the side air bag 50 along the partition line 57 and the rear slanted portion 61 by priority and rapidly. In addition, the flow rate of the gas to the upper rear portion of the side air bag can be increased so that a delay of expansion in the rear portion to the front portion of the side air bag 50 can certainly be restrained.

That is, for stopping a head MH of a occupant after stopping a middle body of the occupant during a side impact collision, the gas flow from the middle body bag portion 53 to the head bag portion 54 is controlled by the partition line 57, which makes the middle body bag portion 53 and the head bag portion 54 separate above and below respectively excepting front and rear end portions in which two vent passages are respectively located so as to relay a expansion of the head bag portion 54 to the middle body bag portion 53. In this moment, the middle body bag portion 53 is expanded over an inner side of the door body 10, while the head bag portion 54 is expanded over an inner side of a part of the wind sealed glass 11, which is above the belt line 6.

As described above, the side air bag 50 has a longitudinal length to enable it to be expanded between an occupant on the seat 3 and the side door 2 even if the seat 3 is adjusted in any longitudinal sliding position. For achieving this, the side air bag 50 is configured to allow a longitudinal distance between the inflator 70 and its rear end to be larger than a longitudinal distance between the inflator 70 and its front end in the expanding condition. However, since the gas nozzle 71 is located at the rear portion of the inflator 70, the tether 58 is formed at the front side of the gas nozzle 71, and the partition line 57 is formed in a straight line and slanted upward going rearward, a guide function for leading a gas for expansion from the inflator 70 to rearward upward (i.e. into the rear potion of the head bag portion 54) becomes smooth to allow the gas to flow into the rear portion of the side air bag first. Thus, during expansion of the side air bag, an expansion performance of the rear portion becomes higher compared with that of a front portion so that expansion delay of the rear portion can be avoided.

In addition, the automobile C described above is a pillar-less type, in which an upper end position of a pillar vertically disposed on the side of a front seat and also on a rear side of the side door 2 for a front seat, is configured to have substantially same height as that of the belt line 6. Since the shape of a lower portion of this pillar gets wider in longitudinal direction as it approaches the side sill 8 to assure its stiffness and is then secured to the side sill 8, a lower rear end portion of the side door 2 has to go frontward and the layout position of the air bag unit 40 equipped in the side door 2 inevitably be positioned frontward. Therefore, an effect cased from a structure in which the air bag unit is located frontward comes to the front more.

As a result, the side air bag 50 can effectively stop an occupant to protect him independently of a longitudinal position of the occupant to the side air bag 50. Further, during a side impact collision, since the upper and lower portions of the air bag unit 40 is displaced toward the vehicle occupant compartment approximately in parallel, a risk that, during a side air bag is expanded, the side air bag gives a shock to an occupant due to the fact that the air bag is slanted to allow an expanded direction of the side air bag 50 to direct to the occupant does not occur. That is, the expanded direction of the side air bag 50 can reliably be directed upward, and the side air bag 50 can reliably be expanded between an occupant and the side door 2.

In the expanded condition of the side air bag 50, since the rear end portion of the upper end portion is shaped into curved portion 64, and the partition line 57 shaped into straight line is directed to the vicinity of the lower end of the curved portion 64, a gas for expansion guided by the partition line 57 is flown frontward by the guide function of the curved portion 64 after filling it up into the rear portion of the head bag portion 54 so that the front portion of the head bag portion 54 can also reliably be expanded.

In the expanded condition of the side air bag 50, since the partition line 57 is slanted in longitudinal direction to horizontal line and the front portion of the partition line 57 is positioned under a belt line 6, while a rear portion of the partition line is positioned above the belt line, i.e. the partition line 57 intersects with the belt line, the partition line 57 will never be in parallel with the belt line, i.e. it will never be in parallel with a swing axis around which a head portion MH of an occupant is swung during a side impact collision so that the side air bag 50 will not bend along the partition line. That is, the expanded head bag portion has stiffness against a bending, thereby even when the head bag portion 54 is not be supported by such as the wind sealed glass 11, the vehicle body 1, and the like, at the upper side of the belt line 6, the side air bag 50 is barely bent at the position of the partition line so that a performance of the head bag portion 54 in stopping a head portion MH. Finally, a protective function for protecting a head portion MH of an occupant by the head bag portion 54 during a side impact collision can significantly be enhanced.

Due to the enhancement of the protective function in the head bag portion, the side air bag 50 can be small in size and this side air bag apparatus S can also be applied to a pillar-less type (open roof type) automobile C. Further, the side air bag 50 can be small in size, thereby an expanding timing can be set up to cause no delay of expanding timing in the head bag portion 54 to expanding timing in the middle body bag portion 53.

As shown in FIG. 9, a position and an inclination of the partition line 57 in 10 the expanded condition is slanted lower as going frontward to make the partition line 57 position on the side of a neck portion of an occupant. Thus, since the seat position is generally adjusted to slide frontward more as shorter body height or seated height, such as for a child, the partition line 57 can be positioned on the side of a neck portion on an occupant independently of a body height of an occupant and the like by setting up the partition line 57 lower going forward, thereby the middle body bag portion 53 can reliably be expanded to a position corresponding to a middle body portion MB, and also the head bag portion reliably be expanding to a position corresponding to a head portion MH.

Further, as described above, since this automobile is a pillar-less type (open roof type), especially in the case that the wind sealed glass 11 is opened, even when the head bag portion 54, which has just stopped a head portion MH of an occupant during a side impact collision, cannot be supported by a pillar, the partition line 57 intersects with the belt line 6 by way of making the partition line 57 lower as going frontward. Thus, the side air bag can be significantly small in size. In addition, though the upper front end portion of the side air bag 50 is shaped into a slanted portion 62, which slants approximately in parallel with the partition line 57 to be lower going forward, a head portion MH of an occupant can certainly be stopped by the head bag portion 54. Thus, the side air bag 50 can be small in size, and this is advantageous for cost reduction.

When the side air bag apparatus S is configured as described above and the longitudinal length of the side air bag 50 is also configured to enable the side air bag to be expanded between an occupant on the seat 3 and the side door 2, a middle body portion MB, MBL and a head portion MH, MHL of the occupant on the seat 3 can effectively be stopped and protected by the middle body bag portion 53 and the head bag portion 54 of the side air bag 50 respectively. Since the side air bag 50 is formed into a bursiform product by joining both peripheral end portions of the door side film member 51 and the occupant side film member 52, the entire structure of the side air bag 50 and the structure of the partition line 57 can be simplified and its 15 excellent reliability can assured.

Figure 12:
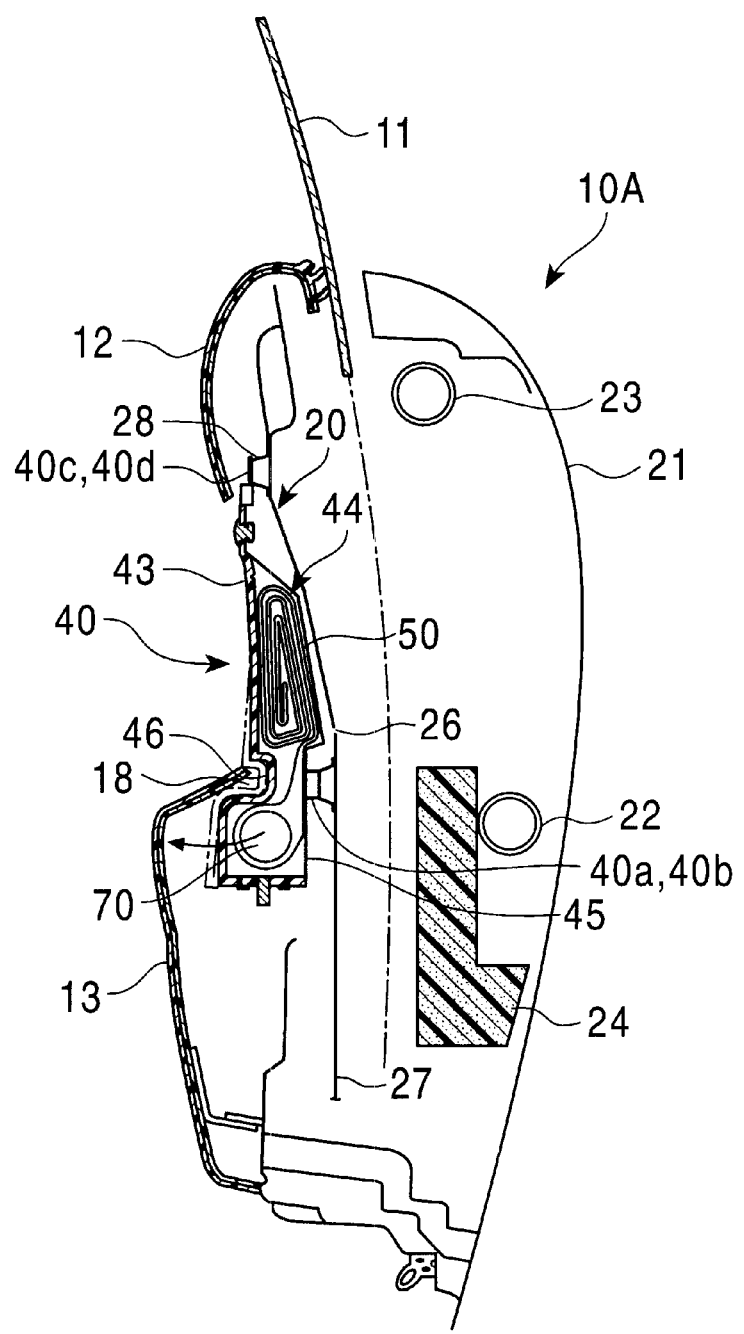
FIG. 12 is a view corresponding to FIG. 5 showing another embodiment.

As shown in FIG. 12, even when no shock-absorbing member is provided outwardly in width direction of the vehicle at a position corresponding to the air bag containing portion 44 and further the distance between the impact bar 22 and the lower attaching portions 40a, 40b is set up smaller than the distance between the impact bar 22 and the upper attaching portion 40c, 40d, the side impact load acted to the lower attaching portions 40a, 40b becomes larger than the side impact load acted to the upper attaching portion 40c, 40d. Particularly, even when a side impact load intensively acts on a position corresponding to a height of the impact bar 22 depending on collision condition, larger side impact load acts on the lower attaching portions 40a, 40b.

In such side impact collision, as shown by two-dots chain line, since the lower portion of the air bag unit 40 is swingably displaced more than the upper portion of the air bag unit, damage of the inflator and the gas passage portion 59 extending to the side air bag 50 during the side impact collision is prevented so that the side air bag 50 can be reliably expanded during the side impact collision. In this case, since the third allowable portion 18 by which the inflator-containing portion 45 is allowed to upwardly displace, is provided, when the air bag unit 40 is displaced by a side impact load, the displacement of the gas passage forming portion 46 toward the vehicle occupant compartment is allowed through this allowable portion 18, thereby compression and deformation of the gas passage forming portion can be avoided.

Figure 13:
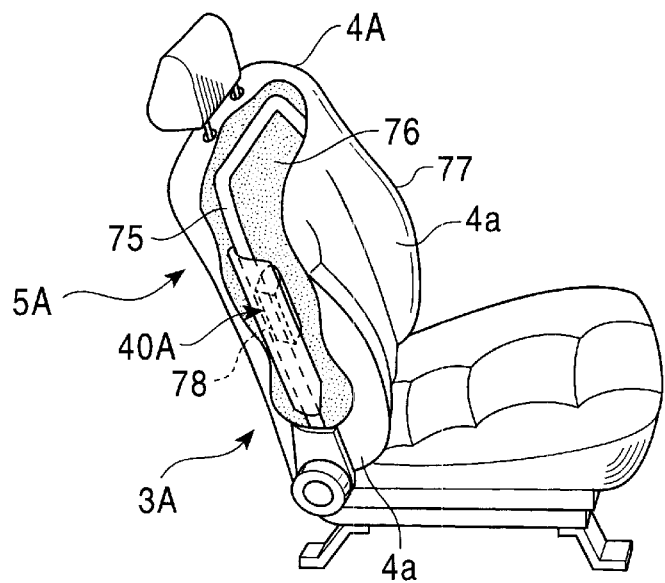
FIG. 13 is a perspective view showing a seat device having a seat back in which an air bag unit is incorporated.
Figure 14:
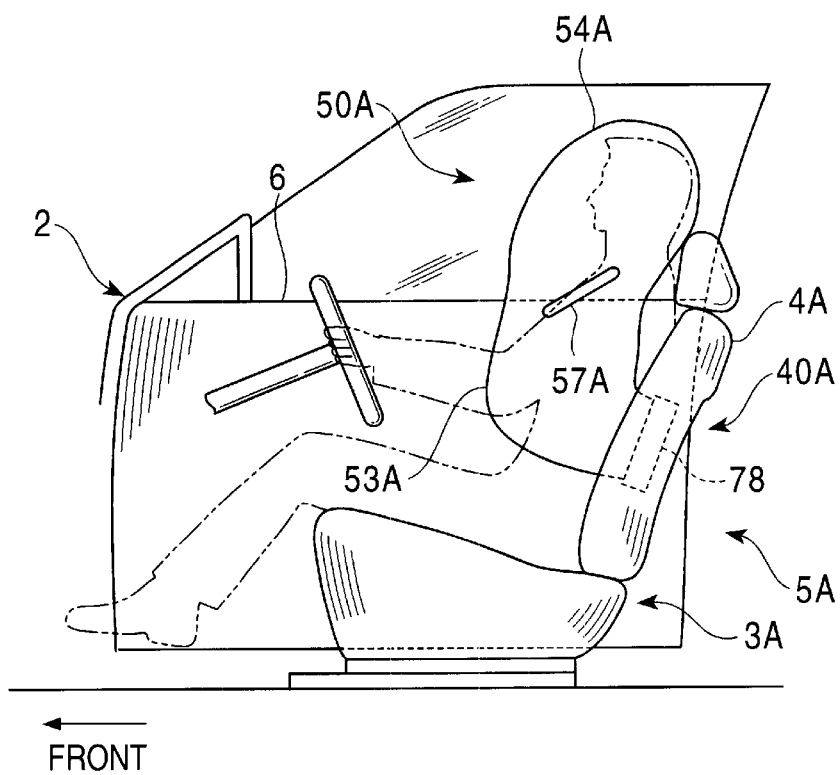
FIG. 14 is a view corresponding to FIG. 2 showing another embodiment.

With reference to FIG. 13 to FIG. 14, a seat mounting type side air bag apparatus, which is equipped in a seat back of a seat device of a pillar-less 15 type (open roof type) automobile C will be described thereafter.

First, a seat mounting type side air bag apparatus, which is incorporated in a seat back 4A of a driver's seat 3A in automobile C will be described.

A seat back frame 75 made of steel pipe is provided around a peripheraL. portion of rear side of the seatback 4A. A pad member 76 made of synthetic formed plastic material is attached to a spring member (not shown), which is secured to this seatback frame 75. A superficial member 77A covers a surface of this pad member. Rising portions 4a are formed at both right and left sides of the seatback 4A.

The side air bag apparatus 5A will be described thereinafter. The side air bag apparatus 5A comprises a side impact detecting sensor (not shown) for detecting a side impact and side air bag unit 40A. The side air bag unit 40A is located within a containing portion formed in the pad member 76 at a middle area of a portion near to the right edge of the seatback 4A and is also secured to the seatback frame 75. The side air bag unit 40A includes an inflator (not shown), a folded side air bag 50A, and a case in which the inflator and the side air bag 50A are contained. The pad member 76 located at a front side of the containing portion is adapted to be partially breakable to allow the side air bag 50A to expand forward.

This side air bag 50A is also configured to vertically extend as same as the aforementioned embodiment, and a partition line 57 is also formed by which an upper head bag portion 54A corresponding to a head portion MH and a lower middle body bag portion 53A corresponding to a middle body portion MB is comparted in the same manner as the embodiment described above. That is, in a expanded condition of the side air bag 50A, the partition line 57A is slanted in longitudinal direction to horizontal line and the front portion of the partition line 57A is positioned under a belt line 6, while a rear portion of the partition line is positioned above the belt line 6, i.e. the partition line 57A is formed to intersect with the belt line 6. The partition line 57A may be formed to make the front position above a belt line 6 and to make the rear portion position under the belt line 6.

When another automobile collides against this automobile C from a lateral 20 direction, a side impact is detected by a side impact sensor, the gas for expansion generated from the inflator is provided to the side air bag 50A, and the side air bag 50A is then expanded from air bag unit 40A between an occupant and the side door within an instantaneous term before an occupant secondarily collides against a side door due to the side impact, thereby the occupant is stopped by the expanded side air bag and is protected. That is, for firstly stopping a middle body MB of the occupant (driver) and then stopping a head MH of a occupant during a side impact collision, the gas flow from the middle body bag portion 53A to the head bag portion 54B is controlled by the partition line 57A so that the expansion in the middle body bag portion 53A to the expansion in the head bag portion 54B can be delayed.

Further, in the expanded condition of the side air bag 50A, since the partition line 57A is slanted in longitudinal direction to horizontal line and the front portion of the partition line 57A is positioned under a belt line 6, while a rear portion of the partition line is positioned above the belt line, i.e. the partition line 57A intersects with the belt line, the partition line 57A never be in parallel with the belt line 6, i.e. it never be in parallel with a swing axis around which a head portion MH of an occupant is swung during a side impact collision so that the side air bag 50A would hardly be bent along the partition line 57A. Thus, a protective function for protecting a head portion MH of a occupant by the head bag portion 54A during a side impact collision can significantly be enhanced as well as the embodiment described above.

In addition, since no relative position between an occupant and the side air bag 50A changes even if the seat 3A is slid to change its longitudinal position, the side air bag 50 can be small in size, and this is advantageous for cost reduction.

The foregoing embodiments may be modified as described thereinafter.
1) The partition line may be formed into a curved line.
2) The shock-absorbing member 24, 25 located within the door body 10 may be configured as one single vertically extending shock-absorbing member.
3) The partition line 57, 57A may be formed to compart the head bag portion 54, 54A and the middle body bag portion 53, 53A except for a side portion in which the rear bent passage 56 is located.
4) A strength of a portion of the reinforcing member 28, by which the first opening portion 26 is surrounded, corresponding to the lower attaching portion 40a, 40b may be set up weaker than a strength of a portion of the reinforcing member 28 corresponding to the upper attaching portion 40c, 40d. In addition, a strength of a portion of the inner panel 20 corresponding to the lower attaching portion 40a, 40b may be set up weaker than a strength of a portion of the inner panel 20 corresponding to the upper attaching portion 40c, 40d. That is, by means of a difference in respective attaching strengths between the upper attaching portion 40c, 40d and the lower attaching portion 40a, 40b, it may be configured to allow an amount of displacement of the lower portion of the air bag unit 40 toward the vehicle occupant compartment to be larger than an amount of displacement of the upper portion of the air bag unit 40 toward the vehicle occupant compartment. In this case, damage to the inflator 70 and a gas passage portion 59 extending from the inflator 70 to the side air bag 50 during a side impact collision can be reliably prevented, thereby the side air bag 50 can reliably be expanded during a side impact collision.

5) With respect to the aforementioned embodiments, various changes and modification may be added in accordance with well-known or conventional technologies and technologies which are apparent to a person skilled in the art.

6) It is apparent that the present invention can be applied to various side air bag apparatuses incorporated in a side door or a seatback of a seat device of various vehicle other than the pillar-less type (open-roof type).

Various effects on the present invention will be described hereinafter.

According to the first aspect of the present invention, since the inflator is contained in the lower portion of air bag unit and the side air bag is contained in the upper portion of air bag unit, and the lower portion of the air bag unit is swingably displaced in larger amount than the upper portion of the air bag unit during a side impact collision, the damage to the inflator and a gas passage portion extending from the inflator to the side air bag during a side impact collision are reliably prevented, thereby the side air bag can reliably be expanded during a side impact collision.

By use of one of a difference in distance between each attachment and a difference in respective attaching strengths, the lower portion of the air bag unit is swingably displaced in a larger amount than the upper portion of the air bag unit during a side impact collision. It can utilize a component, which is necessary for attaching the air bag unit to the inner panel, for making the lower portion of the air bag unit swingably displace a larger amount than the upper portion of the air bag unit during a side impact collision.

According to the second aspect of the present invention, since the inflator is contained in the lower portion of air bag unit and the side air bag is contained in the upper portion of air bag unit, and the air bag unit is moved substantially in parallel toward a vehicle occupant compartment during a side impact collision, the damage to the inflator and a gas passage portion extending from the inflator to the side air bag during a side impact collision are reliably prevented, thereby the side air bag can reliably be expanded during a side impact collision. By use of one of a difference in distance between each attachment and a difference in respective attaching strengths, the air bag unit is moved substantially in parallel toward a vehicle occupant compartment during a side impact collision. It can utilize a component, which is necessary for attaching the air bag unit to the inner panel, for making the air bag unit move substantially in parallel toward a vehicle occupant compartment during a side impact collision.

According to the third aspect of the present invention, since a distance between the impact bar and the lower attaching means in a vertical direction is set up smaller than the distance between the impact bar and the upper attaching means in a vertical direction, a lower portion of the air bag unit is swingably displaced a larger amount than an upper portion of the air bag unit during a side impact collision. As a result, the damage to the inflator and a gas passage portion extending from the inflator to the side air bag during a side impact collision are reliably prevented, thereby the side air bag can reliably be expanded during a side impact collision as well as the apparatus of the first aspect. In addition, it can utilize a component, which is necessary for attaching the air bag unit to the inner panel, for making the lower portion of the air bag unit swingably displace by a larger amount than the upper portion of the air bag unit during a side impact collision.

According to the first preferable configuration, since a reinforcing member is provided between the air bag unit and the inner panel covering an upper attaching portion to which the air bag unit is attached by the upper attaching means and a lower attaching portion to which the air bag unit is attached by the lower attaching means, stiffness around from the lower attaching portion to the upper attaching portion is increased so that it can prevent the air bag unit from being deformed in a folded shape between the lower attaching portion and the upper attaching portion. This configuration includes one of the same effects as the apparatus according to the first to third aspects.

According to the second preferable configuration, since a shock-absorbing member is provided between the air bag unit and the impact bar, a side impact load can be absorbed through the shock-absorbing member and this reduced load acts on the air bag unit through the shock-absorbing member so that damage, such as local deformation of the air bag unit, can certainly be prevented. This configuration includes the same effects as the apparatus according to the third aspect.

According to the third preferable configuration, since a containing portion of the inflator is formed to protrude toward a vehicle occupant compartment more than a containing portion of the air bag, and at least part of the inflator-containing portion is located in an internal space of an armrest, a side impact load acts on the inflator-containing potion as little as possible during a side impact collision so that damage in the inflator-containing portion can be prevented and the internal space of the armrest can be effectively utilized for locating part of the inflator-containing portion. Further since the air bag unit is secured to the inner panel through the lower attachment at a position corresponding to a gas passage forming portion in which a gas passage portion is formed for providing a gas from the inflator to the side air bag, it can prevent a side impact from precedently acting on the inflator. In addition, though the gas passage forming portion lacks stiffness due to less thickness in width direction of a vehicle comparing with that of the inflator, braking down in bended shape by a side impact load can be prevented. This configuration includes one of the same effects as the apparatus according to the first to third aspects.

According to the fourth preferable configuration, since the air bag containing portion is formed to protrude toward the inner panel more than the inflator-containing portion, and the first opening portion is formed in the inner panel and is opposed to a resultant protruding portion, it can make a side impact load difficult to act from the inner panel to the air bag containing portion. Further since the reinforcing member is also formed in frame shape surrounding the first opening portion, strength and stiffness of an attaching structure for attaching the air bag unit to the inner panel can be increased and strength and stiffness of the inner panel in surrounding area of the first opening portion can be also increased. This configuration includes the same effect as the apparatus according to the first preferable configuration.

According to the fifth preferable configuration, a first displacement allowable portion is located between the gas passage forming portion and the armrest to allow the gas passage forming portion to displace toward a vehicle occupant compartment during a side impact collision. Thus since displacement of the gas passage forming portion to a vehicle occupant compartment when the air bag unit is deformed to the vehicle occupant compartment by a side impact load, it can prevent the gas passage forming portion from being compressed or deformed in bended shape. This configuration includes the same effect as the apparatus according to the third preferable configuration.

According to the sixth preferable configuration, a second displacement allowable portion is provided between the inflator-containing portion and the armrest to allow the inflator-containing portion to displace toward a vehicle occupant compartment during a side impact collision. Thus, since displacement of the inflator-containing portion toward a vehicle occupant compartment is allowed through the second displacement allowable portion when the air bag unit is displaced toward the vehicle occupant compartment by acting a side impact load, it can make a compression load difficult to act to the inflator-containing portion, thereby it can also prevent the inflator-containing portion from being damaged. This configuration includes the same effect as the apparatus according to the third preferable configuration.

According to the seventh preferable configuration, since a second opening portion is formed in the inner panel and opposed to a lower portion of the inflator-containing portion, wherein at least part of the shock-absorbing member is located between the impact bar and the lower attaching portion to which the air bag unit is attached by the lower attachment, it can make a side impact load difficult to act on the inner panel of the inflator-containing portion, thereby it can also prevent the inflator from being damaged. In addition, since at least part of the shock-absorbing member is located between the impact bar and the lower attaching portion to which the air bag unit is attached by the lower attachment, the load input to the lower attaching portion from the impact bar can be absorbed. This configuration includes the same effect as the apparatus according to the second preferable configuration.

According to the eighth preferable configuration, since a second shock-absorbing member is provided at a position corresponding to the air bag containing portion of the air bag unit and separated from or integrated with the shock-absorbing member and the position is located outside the air bag containing portion in a width direction of a vehicle, a side impact load acting on the air bag containing portion can be absorbed, thereby damage thereto can be prevented. This configuration includes one of the same effects as the apparatus according to the first to seventh preferable configuration.

According to the seventh preferable configuration, since a second opening portion is formed in the inner panel with being opposed to a lower portion of the inflator-containing portion, wherein at least part of the shock-absorbing member is located between the impact bar and the lower attaching portion to which the air bag unit is attached by the lower attaching means, it can make a side impact load difficult to act from the inner panel to the inflator-containing portion, thereby it can also make the inflator difficult to be damaged. In addition, since at least part of the shock-absorbing member is located between the impact bar and the lower attaching portion to which the air bag unit is attached by the lower attaching means, the load input to the lower attaching portion from the impact bar can be absorbed. This configuration includes the same effect as the apparatus according to the second preferable configuration.

According to the eighth preferable configurations, since a second 15 shock-absorbing member is provided at a position corresponding to the air bag containing portion of the air bag unit with being separated from or integrated with the shock-absorbing member and the position is located outside the air bag containing portion in width direction of a vehicle, a side impact load acted to the air bag containing portion can be absorbed, thereby its damage can be prevented. This configuration includes one of the same effects as the apparatus according to the first to seventh preferable configuration.

What is claimed is:

1. A side air bag apparatus comprising:
   a single air bag unit mounted in a side door of a vehicle including
      a side air bag expandable between an occupant in a vehicle occupant compartment and said side door when a side impact detecting means of said vehicle detects a side impact;
      an inflator providing a gas for expansion of said side air bag, said side air bag and said inflator being respectively contained in an upper portion and a lower portion of said air bag unit,
      upper attaching means and lower attaching means for securing said air bag unit to an inner panel of said side door; a reinforcing member provided between said air bag unit and said inner panel covering an upper attaching portion to which said air bag unit is attached by said upper attaching means and a lower attaching portion to which said air bag unit is attached by said lower attaching means;
   wherein said air bag unit is located inside an impact bar in a width direction of said vehicle and a distance between said impact bar and said lower attaching means in a vertical direction is smaller than a distance between said impact bar and said upper attaching means in the vertical direction and wherein said air bag containing portion of said air bag unit is formed to protrude toward said inner panel more than said inflator-containing portion, and a first opening portion is formed in said inner panel and opposed to the resultant protruding portion of the air bag containing portion, and said reinforcing member is formed in a frame shape surrounding said first opening portion.

2. A side air bag apparatus as defined in claim 1, wherein said air bag unit is located between said inner panel and a door trim, said inflator containing portion being formed to protrude toward said vehicle occupant compartment more than said air bag containing portion, at least part of said inflator-containing portion being located in an internal space of an armrest, said air bag unit being secured to said inner panel through said lower attaching means at a position corresponding to a gas passage forming portion in which a gas passage portion is formed for providing a gas from said inflator to said side air bag.

3. A side air bag apparatus as defined in claim 2 which further includes a first displacement allowable portion located between said gas passage forming portion and said armrest to allow said gas passage forming portion to displace toward said vehicle occupant compartment during a side impact collision.

4. A side air bag apparatus as defined in claim 3 which further includes a second displacement allowable portion provided between said inflator-containing portion and said armrest to allow said inflator-containing portion to displace toward said vehicle occupant compartment during a side impact collision.

5. A side air bag apparatus as defined in claim 1, wherein said side air bag includes
   a lower bag portion expanded inside a door body of said side door with respect to the width direction of said vehicle,
   an upper bag portion expanded inside a wind sealed glass portion positioned above a belt line corresponding to an upper end of said door body, said lower portion and said upper portion being integrated, and a partition line partitioning said lower bag portion from said upper bag portion except for a predetermined area for a vent passage, said partition line being formed in a longitudinal direction of said vehicle so as to slant with respect to the horizontal direction in the expanded condition of said side air bag.

6. A side air bag apparatus as defined in claim 5, wherein said partition line is formed to allow a part of said partition line to be positioned under the belt line in the expanded condition of said side air bag.

7. A side air bag apparatus as defined in claim 5, wherein said partition line is slanted downwardly in a forward direction of the vehicle in the expanded condition of said side air bag.

8. A side air bag apparatus as defined in claim 1, wherein said vehicle is an open-roof automobile including a pillar positioned on the side of a front seat and vertically positioned in a rear portion of said side door, said pillar including an upper end portion having the same height as a belt line.

9. A side air bag apparatus as defined in claim 1, wherein said side air bag is configured to make a distance between said inflator and a rear end of said air bag larger than a distance between said inflator and a front end of said air bag in longitudinal direction in the expanded condition of said side air bag.

10. A side air bag apparatus as defined in claim 1, wherein said side air bag is configured to make a distance between said inflator and a rear end of said air bag larger than a distance between said inflator and a front end of said air bag in a longitudinal direction in the expanded condition of said side air bag, said air bag including a tether portion located at a front side extending over more than a gas nozzle of said inflator and formed by joining a door bag film member and an occupant bag film member of said side air bag to control an expansion in width direction of said vehicle.

11. A side air bag apparatus as defined in claim 1, wherein said side air bag is formed into a bursiform product by joining both peripheral end portions of a door side film member and an occupant side film member, said side air bag being configured to make a distance between said inflator and a rear end of said air bag larger than a distance between said inflator and a front end of said air bag in a longitudinal direction in the expanded condition of said side air bag, and said side air bag further including;
  a lower bag portion expanded inside a door body of said side door;
  an upper bag portion expanded inside a wind sealed glass portion positioned above a belt line corresponding to an upper end of said door body, said lower portion and said upper portion being integrated;
  a dividing line dividing said lower bag portion from said upper bag portion except for two vent passages located at front side and rear side of said dividing line, and
  a tether coupling said both bag film members at a position located on a straight line connecting a gas nozzle of said inflator and said front side vent passage in a gas passage between said dividing line and said inflator in the expanded condition of said side air bag.

12. A side air bag apparatus as defined in claim 11, wherein said dividing line slants upwardly going in a rearward direction of the vehicle.

13. A side air bag apparatus comprising:
a single air bag unit mounted in a side door of a vehicle including
  a side air bag expandable between an occupant and said side door when a side impact detecting means of said vehicle detects a side impact;
  an inflator providing a gas for expansion of said side air bag, said side air bag and said inflator being respectively contained in an upper portion and a lower portion of said air bag unit,
  an impact bar positioned in the door;
  a shock-absorbing member provided between said air bag unit and said impact bar;
  upper attaching means and lower attaching means for securing said air bag unit to an inner panel of said side door;
  a first opening formed in said inner panel;
wherein said air bag unit is located inside said impact bar in a width direction of said vehicle and a distance between said impact bar and said lower attaching means in a vertical direction is smaller than a distance between said impact bar and said upper attaching means in the vertical direction; and
a second opening is formed in said inner panel opposed to a lower portion of said inflator-containing portion, wherein at least part of said shock-absorbing member is located between said impact bar and a lower attaching portion of said inner panel to which said air bag unit is attached by said lower attaching means.

14. A side air bag apparatus as defined in claim 13 which further includes a second shock-absorbing member provided at a position corresponding to said air bag containing portion of said air bag unit, said second shock-absorbing member being separated from or integrated with said shock-absorbing member, said position being located outside said air bag containing portion in the width direction of said vehicle.

15. A side air bag apparatus as defined in claim 13, wherein said side air bag includes
  a lower bag portion expanded inside a door body of said side door with respect to the width direction of said vehicle,
  an upper bag portion expanded inside a wind sealed glass portion positioned above a belt line corresponding to an upper end of said door body, said lower portion and said upper portion being integrated, and
  partition line partitioning said lower bag lower bag portion from said upper bag portion except for a predetermined area for a vent passage, said partition line being formed in a longitudinal direction of said vehicle so as to slant with respect to the horizontal direction in the expanded condition of said air bag.

16. A side air bag apparatus as defined in claim 15, wherein said partition line is formed to allow a part of said partition line to be positioned under the belt line in the expanded condition of said side air bag.

17. A side air bag apparatus as defined in claim 15, wherein said partition line is slanted downwardly in a forward direction of the vehicle in the expanded condition of said side air bag.

18. A side air bag apparatus as defined in claim 13, wherein said vehicle is an open-roof automobile including a pillar positioned on the side of a front seat and vertically positioned in a rear portion of said side door, said pillar including an upper end portion having the same height as a belt line.

19. A side air bag apparatus as defined in claim 13, wherein said side air bag is configured to make a distance between said inflator and a rear end of said air bag larger than a distance between said inflator and a front end of said air bag in longitudinal direction in the expanded condition of said side air bag.

20. A side air bag apparatus as defined in claim 13, wherein said side air bag is configured to make a distance between said inflator and a rear end of said air bag larger than a distance between said inflator and a front end of said air bag in a longitudinal direction in the expanded condition of said side air bag, said air bag including a tether portion located at a front side extending over more than a gas nozzle of said inflator and formed by joining a door bag film member and a occupant bag film member of said side air bag to control an expansion in the width direction of said vehicle.

21. A side air bag apparatus as defined in claim 13, wherein said side air bag is formed into a bursiform product by joining both peripheral end portions of a door side film member and an occupant side film member, said side air bag being configured to make a distance between said inflator and a rear end of said air bag larger than a distance between said inflator and a front end of said air bag in a longitudinal direction in the expanded condition of said side air bag, and said side air bag further including;
- a lower bag portion expanded inside a door body of said side door;
- an upper bag portion expanded inside a wind sealed glass portion positioned above a belt line corresponding to an upper end of said door body, said lower portion and said upper portion being integrated;
- a dividing line dividing said lower bag portion from said upper bag portion except for two vent passages located at front side and rear side of said dividing line, and
- a tether coupling said both bag film members at a position located on a straight line connecting a gas nozzle of said inflator and said front side vent passage in a gas passage between said dividing line and said inflator in the expanded condition of said side air bag.

\* \* \* \* \*